United States Patent [19]

Liu

[11] Patent Number: 5,130,922

[45] Date of Patent: Jul. 14, 1992

[54] MULTIPROCESSOR CACHE MEMORY SYSTEM USING TEMPORARY ACCESS STATES AND METHOD FOR OPERATING SUCH A MEMORY

[75] Inventor: Lishing Liu, Pleasantville, N.Y.

[73] Assignee: International Business Machines Corporation, Armonk, N.Y.

[21] Appl. No.: 353,380

[22] Filed: May 17, 1989

[51] Int. Cl.$^5$ .................... G06F 13/22; G06F 13/18
[52] U.S. Cl. ................................. 395/200; 395/425
[58] Field of Search ............................. 364/200, 900

[56] References Cited

U.S. PATENT DOCUMENTS

| | | | |
|---|---|---|---|
| 4,394,731 | 7/1983 | Flusche et al. | 364/200 |
| 4,484,267 | 11/1984 | Fletcher | 364/200 |
| 4,503,497 | 3/1985 | Krygowski et al. | 364/200 |
| 4,797,814 | 1/1989 | Brenza | 364/200 |

Primary Examiner—Gareth D. Shaw
Assistant Examiner—John Q. Chavis
Attorney, Agent, or Firm—Ratner & Prestia

[57] ABSTRACT

A store-in cache memory system for a multiprocessor computer system has a status entry in the cache directory which is RO (read-only) when a line of data is read-only, and thus accessible by all processors on the system, or EX (exclusive) when the line accessible for reading or writing but only by one processor. In addition, each directory has an entry, CH, which is set when data in the line is changed. The cache memory system includes two additional statuses, TEX, or temporary exclusive, and TRO, or temporary read-only. When a data fetch instruction results in a cache-miss, and a line containing the requested data is found in a remote cache with an EX status and with its CH bit set, the line is copied to the requesting cache and assigned a status of TEX. The line of data in the remote cache receives a status of TRO. If a store operation for the data occurs within a short time frame, the status in the requesting cache changes to EX and the line in the remote cache is invalidated. Otherwise, the data in the line is castout to main storage and the status of the line becomes RO in both the requesting and remote caches. The addition of these statuses allows the cache system to assign an exclusive status on an anticipatory basis without incurring penalties when this assignment is not appropriate.

8 Claims, 4 Drawing Sheets

MULTIPROCESSOR CACHE MEMORY SYSTEM USING TEMPORARY ACCESS STATES AND METHOD FOR OPERATING SUCH A MEMORY

BACKGROUND OF THE INVENTION

1. Field of the Invention

The present invention relates generally to cache memories in a multiprocessor data processing system and more particularly to the use of temporary access states to indicate how data may be accessed via store-in cache memories.

2. Description of the Prior Art

Modern high performance stored program digital computers conventionally access instructions and data that reside in a main storage by using a cache memory. A cache memory is a memory located in close proximity to a processor which is typically much smaller and much faster than the main storage of the computer. Virtually all high performance digital computers use cache memories and even some commercially available microprocessors include cache memories in their architectures.

Cache memories have been developed because it has not been possible to build extremely large memories at a reasonable cost that have a data access time commensurate with modern-day pipelined processors. It is, however, possible to build inexpensive, small memories that can keep up with the processors.

The design of a cache memory takes advantage of two properties which have been observed in data processing systems. The first property is known as temporal locality of reference. This property refers to the tendency of a processor to access an instruction or data value repeatedly during a relatively small time interval. The second property is known as spatial locality of reference. This property refers to the tendency of a processor, during a small time interval, to access data or instructions which have addresses in the main storage that differ by a relatively small value. These first and second properties form the rationale for keeping, in a cache memory, memory words containing both the most recently accessed data and instructions and respective lines of memory which are immediately adjacent to these most recently accessed words in the address space of the processor.

Cache memories may be used in both single processor and multiprocessor systems. In a type of multiprocessor system known as a tightly-coupled system, several central processors, which each have their own cache memories, share a common operating system and a common main storage. In a tightly-coupled system, it is desirable for each cache memory to operate in concert with all of the other cache memories. In particular, each processor should be able to obtain the most recently updated version of a data value regardless of whether it is located in main storage or in the cache memory of another processor. Consequently, it is desirable to constantly monitor data consistencies among the caches. This monitoring operation is known as cache coherence control.

There are various types of cache memories in the prior art. One type is the store-through (ST) cache memory, in which a data store instruction has three parts: a store into the cache memory associated with the processor initiating the instruction, a store into the main storage, and a sequence of cross-interrogate (XI) actions which invalidate any local copies of the data in other cache memories on the system. Usually, ST cache memory designs require substantial main storage bandwidth to operate efficiently.

Another type of design is the store-in (SI) cache. An SI cache design and its use by a multiprocessor system is described in U.S. Pat. No. 4,503,497 to Krygowski et al., which is hereby incorporated by reference. In a SI cache, data values are transferred among the various cache memories via a cache-to-cache (CTC) transfer bus. This type of cache also uses XI actions to coordinate the contents of the various cache memories. A central storage controller, which controls all memory access, contains a directory of the contents of the various cache memories. In the system described in the referenced patent, each line of adjacent memory words held by a cache memory has its access controlled by an exclusive/read-only (EX/RO) flag bit. Usually, data values are updated in the main storage only when lines of memory words are replaced from a cache memory and the data in the lines has been modified.

Lines of memory words may be replaced from a cache and written into the main storage in accordance with, for example, a least-recently-used (LRU) scheme. The transfer of a line of memory words from a cache to the main storage is known as a castout operation. Since data is written into the main storage only when it is castout of a cache, the storage bandwidth requirements of a multiprocessor system using SI cache memories are less than that of a comparable system using ST cache memories. However, this drop in bandwidth requirements is obtained at the expense of a more complex cache coherence control system and the penalties to the execution speed of the processors caused by the cache-to-cache copy operations and the concomitant XI events.

In a typical multiprocessor system using SI cache memories, each cache includes a cache directory which contains information as to whether the access to a line of memory words is read only (RO), exclusive (EX) or invalid (INV). In addition, if the line of memory words has an EX status, the directory contains information (a bit CH) indicating whether any data in the line has been changed.

If the status of a line is RO the data in that line may only be read. Generally, a line of instruction words has this status. An RO cache line may exist simultaneously in several different cache memories.

If a line of memory words has a status of EX, that line may appear in the cache of only one processor. The processor which has the line in its cache is the only processor that is allowed to fetch data from or store data into the line of memory words. If, in addition, the directory entry, CH, for the line indicates that data in the line has been changed, then the data in the cache line does not match the corresponding data in main storage. When a line having its CH bit set is replaced in the cache, a copy is sent to the main storage via the castout action.

A line of memory words has the INV status when it is invalid. A status of EX or RO for a line in one cache memory is changed to INV when the line is obtained with an EX status by another cache memory.

A typical multiprocessor system using SI cache memories (e.g., as in U.S. Pat. No. 4,503,497 referenced above) operates as follows. Initially, a processor requests a data word via, for example, a data fetch instruction. Responsive to this request, the processor checks its own cache for a line containing the word. If the cache contains the line, the data word is passed to the processor in the normal course of instruction execution. If, however, the processor fails to find the line in its own cache, the request is passed on to the storage controller. The storage controller checks the request against a directory which indicates the contents of all of the caches. If the target line is found in a remote cache and its status is RO, it is copied over to the requesting cache, if its status is EX and its CH bit is reset, the line is copied to the requesting cache with a status of RO and the status of the line in the remote cache is changed to RO. If the CH bit is set, the line is copied to the requesting cache with the EX status and with its CH bit set; the copy of the line in the remote cache is invalidated. By keeping the EX status and the CH bit set for the line, the system anticipates that the processor will store data into the line in the near future. Finally, if the target line of data is not found in any cache, it is accessed from the main storage and assigned a status of RO.

The approach outlined above may result in unnecessary loss of concurrency in a multiprocessor cache memory system. This may occur, for example, when data in a line is frequently accessed and only infrequently modified. Once a line is modified by a processor, it will have an EX status and will have its CH bit set. This state will continue until the line is replaced from a cache through the LRU replacement algorithm. In this example, each of the frequent fetches for the line may cause an XI event to invalidate the copy of the line in the remote cache.

This anomaly occurs because once data in a line having a status of EX, is changed, its CH bit remains set until the line is castout to main storage. As caches grow larger and the number of processors used in a multiprocessor system increases, this problem becomes even greater. With larger caches, lines do not age out as quickly and, as the number of processors increases, there is a greater tendency for a line to be passed around among the processors via XI events without getting a chance to age out.

U.S. Pat. No. 4,484,267 to Fletcher relates to a hybrid cache architecture in which data in a line may be treated as in a store-in cache in some situations and as in a store-through cache in other situations. In the system described in this patent, the EX/RO bit in the cache directory is replaced by a shared (SH) bit. When a line of data is first accessed, the SH bit for the line is set to zero. This causes the line to be treated as if it were in an SI cache and had the EX status. If another processor accesses the data in that line, the storage control element sets the SH bit to 1 allowing the cache coupled to the other processor to copy the line via the CTC bus. If either processor then requests a store operation for data in the line, the new data is stored in the line in the requesting cache and in main storage as in an ST cache. At the same time, an XI event invalidates all copies of the line in other caches. The SH bit in the requesting cache remains set, however, so that if another cache attempts to access the data, the request may be satisfied by copying the line over the CTC bus.

U.S. Pat. No. 4,394,731 to Flusche et al. relates to a multiprocessor SI cache memory system. In this system, a line having an EX status may be obtained in two instances, first, when there is no copy of the line in any of the remote caches and second, when the line exists in a remote cache and has a status of EX status and has its CH bit set. This cache system does not include a cache-to-cache bus, so, in the second instance described above, the CH line is castout to main storage and then it is assigned to the requesting cache with EX status. If the line of data in the remote cache has a status of EX and a reset CH bit, the status in the remote cache is downgraded to RO and the line is copied from main storage to the requesting cache with an RO status.

U.S. Pat. No. 4,503,497 to Krygowski et al. relates to a multiprocessor SI cache memory system that includes a cache-to-cache transfer bus. This system transfers a target line, that has an EX status and a set CH bit, from a remote cache to the requesting cache without changing the status of the line or the state of its CH bit and without accessing main storage. The target line is invalidated in the remote cache.

SUMMARY OF THE INVENTION

It is an object of the present invention to provide a multiprocessor cache memory system which makes effective use of an anticipatory exclusive status acquisition by avoiding unnecessary XI and invalidate events.

The present invention is embodied in a multiprocessor cache memory system in which lines of data accessed in response to a cache miss are assigned a temporary exclusive (TEX) status. This status is rapidly aged. If, an attempt is made to store into a TEX line before the status has aged, the status is upgraded to EX. If no attempt is made to store into the line before it has aged, the status is downgraded to RO. According to a further feature of the invention, when the accessed line resides in a remote cache, its status in the remote cache is set to temporary read-only (TRO) while the line has the TEX status in the requesting cache. If the TEX status is upgraded to EX, the line in the remote cache is marked invalid. Alternatively, if the TEX status is downgraded to RO, the TRO status is upgraded to RO.

DETAILED DESCRIPTION OF THE PREFERRED EMBODIMENT

The following is a description of an exemplary store-in cache memory system in accordance with the present invention. The system described herein is an improvement of the system set forth in the U.S. Pat. No. 4,503,497 to Krygowski, which is hereby incorporated by reference.

Store-in cache memory systems are typically used in modern multiprocessor mainframe computers such as the 3090 system manufactured by IBM Corporation. In these systems, there is one cache memory for each processor.

A directory is associated with each cache memory and each entry in the directory can have one of three possible statuses: INV, RO and EX. The INV status indicates that the entry in the directory is invalid. This status is assigned to a line of data in one cache, for example, when the line, which had an RO status in the one cache, is obtained by another cache with an EX status.

The RO status indicates that the line of data is valid in a read-only state. The processor can only fetch data from the line. A line of data may be simultaneously resident in several caches if it has an RO status in each cache directory.

When a line of data has the EX status in its cache directory entry, it may not be resident in any other cache. The processor which owns the cache is the only processor allowed to store data into the line without an intervening XI event.

The CH bit in the cache directory is operative only for lines of data having an EX status. The CH bit, when it is set, indicates that data has been stored into the line. When this bit is set in the directory entry for a line, it indicates that the line of data in the cache may not be the same as the corresponding line of data in the main storage. When a line having its CH bit set is replaced in the cache, the modifications to the line are sent to main storage via the castout action.

A system in accordance with the present invention enhances the SI cache design by adding two statuses: temporary exclusive (TEX) and temporary read-only (TRO). The TEX status is assigned to a line, copied to a requesting cache, which was found in a remote cache with the EX status and with a set CH bit. The line in the remote cache is not invalidated, its status is set to TRO.

The status of TEX is only a transient status. If no attempt is made to store data into the line while it has the TEX status, the status of the line in the requesting cache is downgraded to RO and that of the line in the remote cache is upgraded to RO. If, alternatively, data is stored into the line while its status is TEX, the status of the requesting line is upgraded to EX and the status of the remote line is set to INV. This strategy for anticipating a store into a line which has been accessed in response to a data fetch request by assigning an EX status to the line temporarily exploits an observed tendency of a multiprocessor system. The inventor has observed that, when a processor changes data after first accessing it with a fetch request, it does so relatively quickly after the fetch request.

This strategy reduces unnecessary XI events and invalidate operations since the line of data remains resident in both the remote and requesting cache memories when a temporary EX status is assigned. Thus, if data in a line is frequently fetched but only infrequently changed, the line will have a status of RO allowing the data to be shared by several processors for most of the fetch requests. The line will have an EX status only infrequently, when data in the line is changed.

Figure 1:
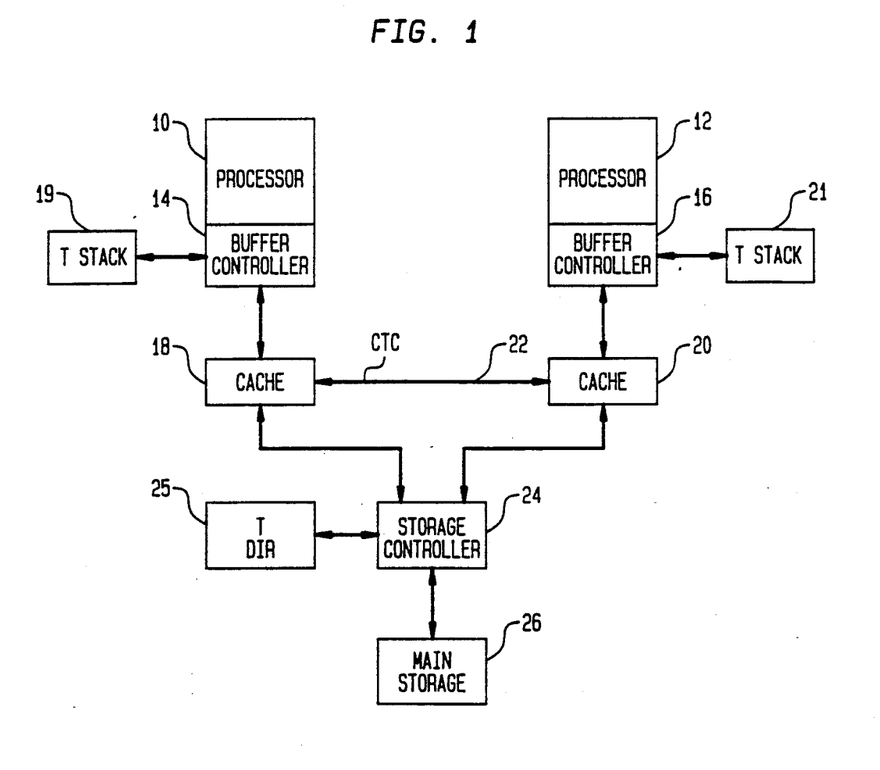
FIG. 1 is a block diagram of a multiprocessor system which includes an embodiment of the present invention.

FIG. 1 is a block diagram of a two processor system which includes an embodiment of the present invention. In the examples which follow, one processor, 10, is the requesting processor and the other processor, 12, is the remote processor. While the examples presented below are in the context of a two processor system, one skilled in the art can readily extend this system to include a larger number of processors.

Referring to FIG. 1, cache memories 18 and 20 are coupled to a common storage controller 24. The caches 18 and 20 are also coupled to the respective processors 10 and 12 via buffer controllers 14 and 16, respectively. The buffer controllers maintain the directories for their associated cache memories. The storage controller 24 maintains a copy of a portion of the directory from each of the buffer controllers 18 and 20.

All memory accesses generated by the processors 10 and 12 are handled through their associated cache memories 18 and 20. When a data item is not found in the cache (i.e. on a cache miss), the buffer controller conditions the cache to generate a request, to the storage controller 24, for access to the data. The storage controller 24 takes the necessary steps to obtain a copy of the line of data which includes the requested data item. This line may be obtained from a remote cache or, if it is not found in a remote cache, it may be obtained from main storage 26. When the requested data is found in a remote cache, it may be transferred to the requesting cache via a cache-to-cache (CTC) bus 22 without accessing main storage 26. The cache memories 18 and 20 are coupled to respective temporary stack memories 19 and 21. The storage controller 24 is coupled to a temporary directory memory 25. The function of these memories is set forth below.

Upon receiving a request from the cache 18 or 20, the storage controller 24 determines what action is needed to grant the requested access to the requested data. Since the storage controller 24 maintains partial copies of the directories for the processor caches, it can determine if there are copies of the target line containing the requested data in other caches. Moreover, the storage controller can determine which cache contains the target line and what status is assigned to it.

Three types of memory access are of interest for the present invention, instruction fetches (I-fetches), data or operand fetches (D-fetches) and data or operand stores (D-stores). I-fetches and D-fetches request read access to the data, while D-stores request write access. Accordingly, a line of data accessed with an I-fetch is generally assigned an RO status and a line of data accessed with a D-store is generally assigned an EX status. A line of data accessed with a D-fetch request is assigned an RO status in some instances and an EX status in others.

For example, in the model 3081 computer, manufactured by IBM Corporation, when a cache miss occurs on a D-fetch request and a line containing the data is located in a remote cache with an EX status and a set CH bit, the requesting cache assigns an EX status in anticipation of future store requests from the requesting processor. This strategy is based on the observation that a line of data which has been modified by one processor tends to be modified again even when the first access request is a D-fetch. However, this anticipatory strategy may result in unnecessary cross-interrogate (XI) events and unnecessary invalidate operations, as described above, when store requests cease to be generated for the line.

Figure 2:
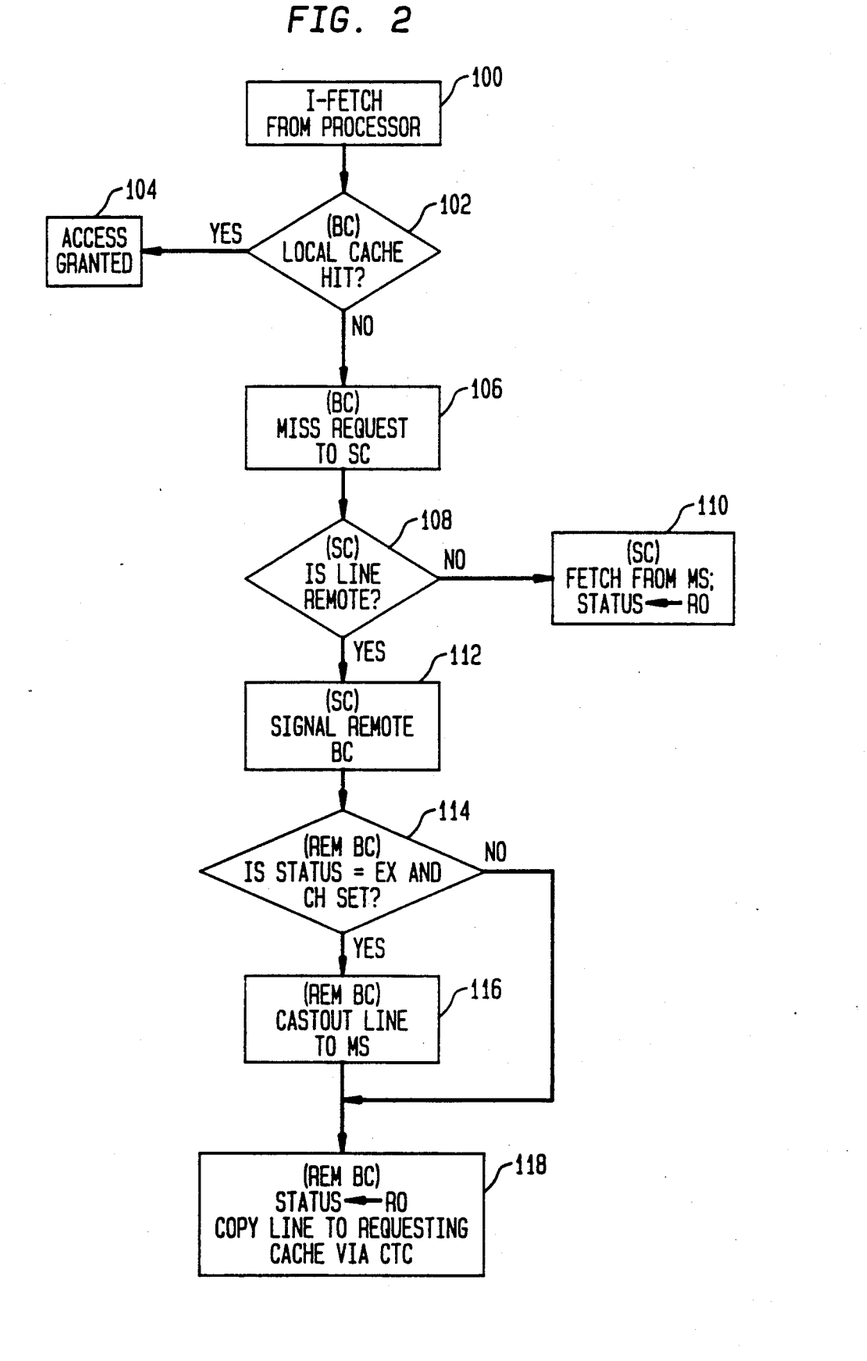
FIGS. 2–4 are flow charts describing the operation of the cache memory system used in the multiprocessor system shown in FIG. 1.

The various fetch and store operations are described below with reference to FIGS. 2-4. In step 100 of FIG. 2, the processor 10 has made an I-fetch request. At step 102, the buffer controller 14 checks its directory of the cache 18 for a line containing the requested data. If the line is found resident in the cache 18, access to the data is granted at step 104. If the line of data is not found in the cache 18 (i.e. a cache miss), the buffer controller 14, at step 106, requests the data from the storage controller 24. At step 108, the storage controller 24 determines if the requested line is in the remote cache 20. If the line is not in the remote cache, the storage controller 24, at step 110, requests the data from the main storage (MS) 26. If the requested line is found in the remote cache 20, it should have a status of RO, since the line of data is obtained in response to an I-fetch request. This test is represented by the NO branch from the decision block 114. In this instance, the line is copied, at step 118, from the remote cache 20 to the requesting cache 18 via the CTC bus 22. Its status is not changed.

It is possible, however, for a line accessed in response to an I-fetch request to have a status of EX in the remote cache 20. In this instance, the CH bit may be set or reset. When the remote line has an EX status and the CH bit is reset, the decision block 114, by its NO branch, transfers control to the step 118. At step 118, the line is copied from the remote cache 20 to the requesting cache 18, via the CTC bus 22, and the status of the line in both caches is changed to RO. The YES branch of the decision block 114 conditions the remote buffer controller, at step 116, to castout the changed line to the main storage 26 and then to execute step 118. When the line of data is in the requesting cache with a status of RO as a result of step 110 or step 118, the processor 10 may fetch the requested instruction.

Figure 3:
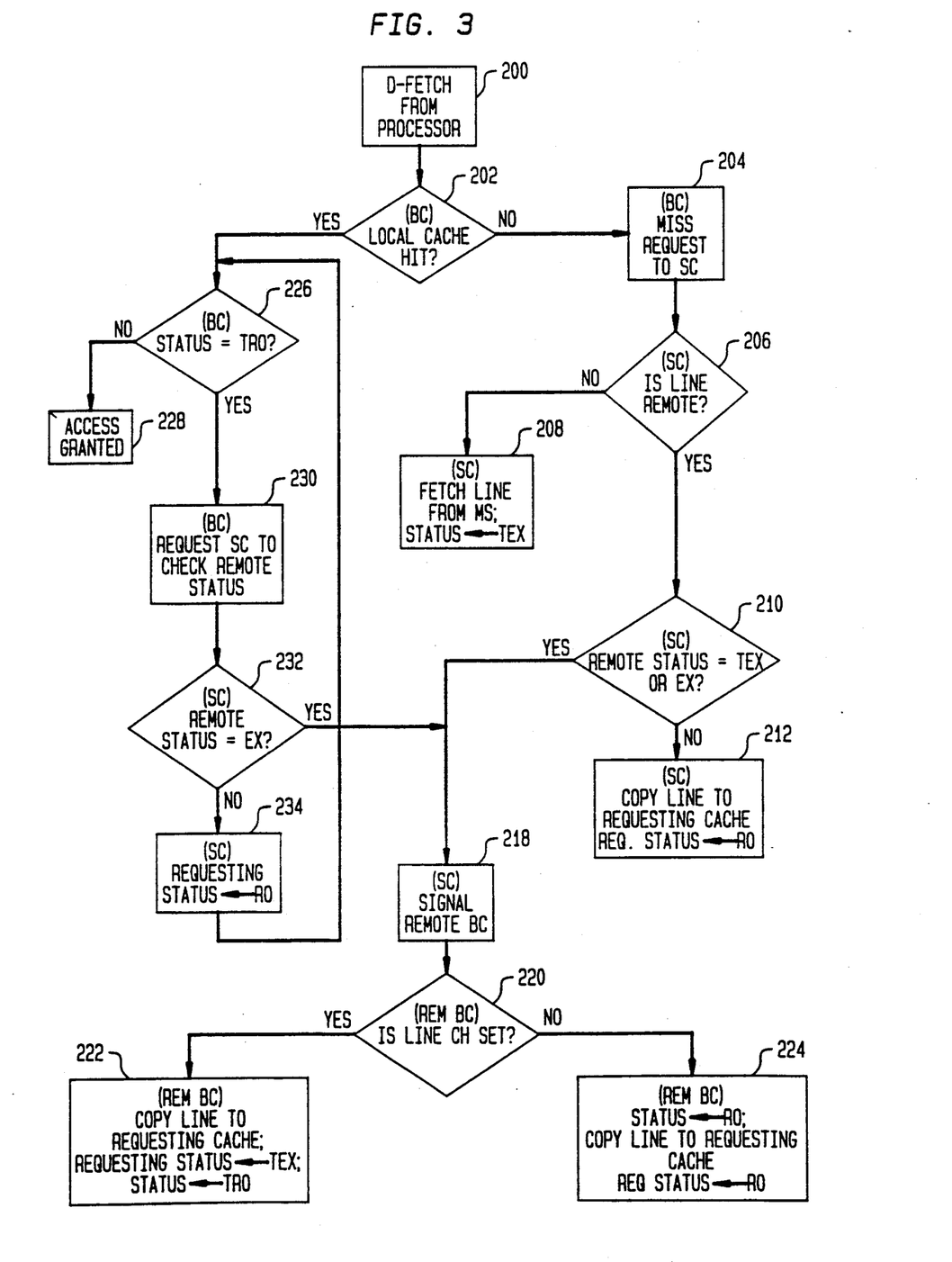
Figure 4:
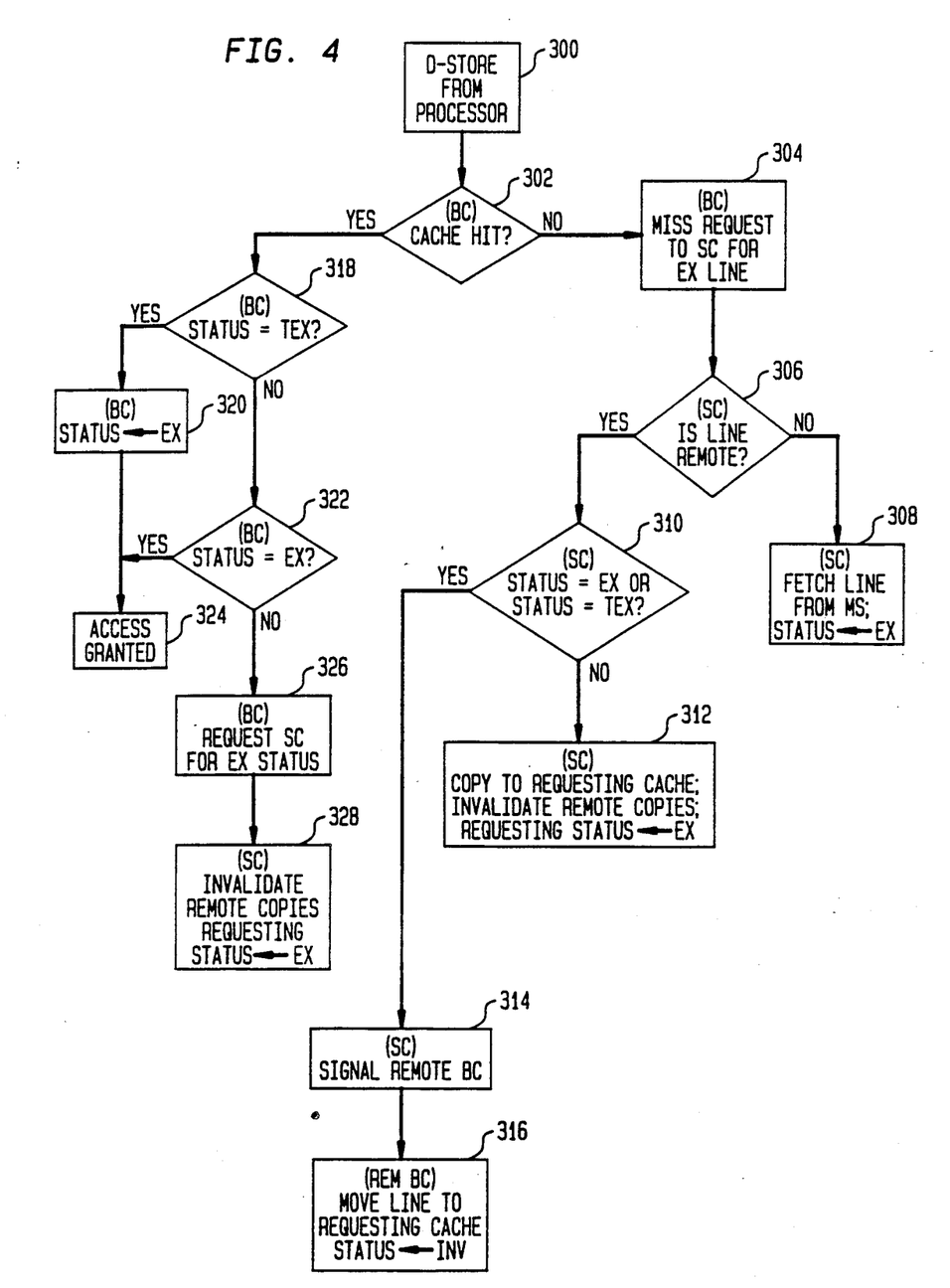

FIG. 3 is a flow-chart diagram which illustrates the steps taken by the system shown in FIG. 1 when the processor 10, at step 200, initiates a D-fetch request to the cache memory 18. At step 202, the buffer controller 14 determines if the requested data is in the cache memory 18. If the data is not found in the cache 18, the buffer controller 14, at step 204, issues a request to the storage controller 24 to access the data from the remote cache 20 or from the main storage 26. Responsive to this request, the storage controller 24, at step 206 determines if a line containing the requested data is in the remote cache 20. If the data is not in the remote cache, the storage controller 24, at step 208, issues a fetch request for the data from the main storage 26, to provide the data to the cache 18 with a status of TEX. This status assignment assumes that a word in the requested line will be stored into soon after the word is brought into the cache. If this assumption is wrong, the TEX status is automatically downgraded to an RO status.

If, at step 206, the storage controller 24 finds the requested data in the remote cache 18, it next determines the status of the line, at step 210. If the status is RO, the storage controller 24, at step 212, copies the line to the requesting cache and assigns it a status of RO in the requesting cache.

If the status of the line in the remote cache, as determined at step 210, is EX or TEX, the storage controller 24, at step 218, signals the buffer controller 16 that it wants access to the line. The buffer controller 16 tests the CH bit of the line at step 220. If the CH bit is reset, the controller 16, at step 224 changes the status of the line to RO and copies the line, with the RO status, to the requesting cache 18. The status in the requesting cache is RO. If the CH bit is set, the remote buffer controller 16 signals the storage controller 24 to copy the line to the requesting cache 18 with a status of TEX. The CH bit remains set. The remote cache 20 changes the status of its copy of the line to TRO.

If, at step 202, the requesting buffer controller 14 finds the line in the requesting cache 18, it transfers control to the step 226. At step 226, the controller 14 checks the status of the line. If the line has a status of RO, EX or TEX, it may be accessed by the processor. This condition is represented by the NO branch of the decision block 226. This branch causes the step 228 to be executed which provides the requested data to the processor 10.

If, however, the status of the line in the requesting cache was determined to be TRO, the buffer controller 14 does not immediately grant access to the data because this status indicates that the line may be in a remote cache with a status of TEX. Accordingly, the controller 14 executes a loop which includes steps 226, 230, 232 and 234. This loop signals the storage controller 24 to check the status of the line in the remote cache and waits for the status to age and change to EX or RO. As set forth below, the aging process is rapid and the TEX status occurs relatively infrequently, so the loop should not cause a significant delay in allowing access to data in the line. If the status of the remote line changes to RO, the storage controller 24 changes the requesting status to RO and the requesting cache may access the data. Alternatively, if the status in the remote cache is EX, the storage controller, at step 232, transfers control to the step 218 which grants the requesting cache access to the line as set forth above.

The last type of data request generated by a processor is the D-store. In FIG. 4, the processor 10 generates a D-store request at step 300. In response to this request, the buffer controller 14, at step 302, checks its directory to determine if a line containing the data resides in the cache 18. If so, the buffer controller 14, in the decision block 318, checks if the status of the line is TEX. If the buffer controller finds a status of TEX, it executes a step 320 which changes the status to EX and then grants access to the line, allowing the store operation to occur at step 324. If, alternatively, the buffer controller 14 finds the status of the line to not be TEX, it executes the decision block 322 which tests if the status of the line is EX. If an EX status is found, the buffer controller, at step 324, allows the store operation to occur. If the status of the line is not EX, it may be either RO or TRO. In either case, the buffer controller, at step 326 requests the storage controller 24 to grant EX status for the line. In response to this request, the controller 24 invalidates any copies of the line in remote cache memories and then sets the status of the line in the requesting cache 18 to EX.

When the initial test at block 302 does not find the line in the cache 18, the buffer controller 14, at step 304 issues a request to the storage controller 24 for a line with EX status. In response to this request, the storage controller 24, at step 306, determines if a line containing the memory location into which the data is to be stored is resident in the remote cache 20. If the line is not in the remote cache, the storage controller 24 fetches the line from main storage 26 and assigns it to the requesting cache with a status of EX. If the storage controller 24 finds the line in a remote cache, it tests the status of the line at step 310. If the step 310 finds a status of EX or TEX, the storage controller 24, at step 314 signals the remote buffer controller 16 to transfer the line to the requesting cache 18 and change the status of the remote copy of the line to INV (step 316).

If the storage controller 24 finds the remote line with a status of RO or TRO, it initiates a copying of the line from the remote cache to the requesting cache, at step 312, invalidates any remote copies of the line and sets the status of the line in the requesting cache to EX.

After any of the steps 308, 312, 316 or 328, when the requesting cache has the line with an EX status it grants the requesting processor 10 access to the data.

Although it is not explicitly shown in the flow-charts described above, it is possible for the storage controller 24 to modify a request issued by one of the buffer controllers 14 and 16. A modification of this type would occur when the status of a line has changed between the time that the request was issued and the time that it was acted upon by the system controller 24. For example, assume that, at step 226 of FIG. 3, the status of a line is determined to be TRO and the buffer controller 14 requests the storage controller 24 to check the remote status of the line. It is possible that, before this request can be made, the status of the line in the requesting cache is changed to INV and, causing the line to be inaccessible from that cache. In this instance, the system controller 24 handles the request as a miss request (i.e. from step 206) rather than a request to check remote status from step 230.

The description set forth above relates to the control flow through the storage controller 24 and the buffer controllers 14 and 16 in handling I-fetch, D-fetch and D-store requests from one processor in a multiprocessor environment. Except for the instruction loop in FIG. 3, this description is not concerned with the aging of the TEX and 1TRO statuses. The aging of these statuses, however, is an important factor in the operation of a SI cache memory system which operates in accordance with the present invention.

In the present embodiment of the invention, the storage controller 24 and the buffer controllers 14 and 16 use separate data structures to both age and keep track of the TEX and TRO statuses. These data structures are the temporary directory 25, and the temporary stacks 19 and 21, respectively. The temporary stacks 19 and 21 each include, for example, a pair of small stacks. One stack in each buffer controller holds data indicating which lines have the status of TEX while the other stack holds data indicating which lines have the status of TRO. Each stack includes N registers arranged as an associative memory. The temporary directory is an associative memory having P times N entries, where P is the number of processors in the multiprocessor system. This directory has sufficient space to hold one entry for each line having a TEX status in the multiprocessor system. In this embodiment of the invention, N is one and P is two.

When a line is fetched into, for example, cache 18 with a status of TEX, its status in the local directory of the buffer controller 14 may be, for example, set to RO and a token identifying the line (e.g. its line address or cache coordinate) is pushed into the TEX stack of the controller 14. In addition, an entry for the line is made in the temporary directory of the storage controller 24. Similarly, when a line already in the cache 18 is given the TRO status, its directory entry may be given an INV status and a token identifying the line may be pushed onto the TRO stack.

In the examples presented above, any access to a line that is in either stack is automatically trapped (i.e. routed through the relevant stack) to determine its status. This method of operation establishes default status values for when a line is aged out; TEX lines become RO lines and TRO lines become INV lines. This status assignment provides a fail-safe feature, preventing a processor from getting an impermissible access to a line in the time interval between its deletion from the TRO stack and the changing of its directory entry. In these examples, the directory entry for an item is only changed when a TEX status is upgraded to EX or when a TRO status is upgraded to RO.

When data is stored into a line having a TEX status, the status for the line is immediately converted to EX by deleting the entry for the line in the TEX stack and changing the directory entry. At the same time, a signal is sent to the storage controller 24 to remove the corresponding entry from the temporary directory and to invalidate any copies of the line in remote caches. This operation invalidates the line in the caches controller directories associated with the remote processors by simply deleting the corresponding entries from the respective TRO stacks.

The TEX and TRO statuses are aged by the replacement operation. When a new entry is made to a stack, one of the old entries is deleted (replaced). For example, when an entry in the TRO stack of the controller 14 is replaced, the status in its corresponding entry in the local directory of the controller 14 automatically becomes INV. When an entry in the TEX stack of the buffer controller 14 is replaced, the corresponding line is automatically is given a status of RO. In this instance, it may be desirable to change the status of any copies of the formerly TEX entry which may exist in the remote caches from TRO to RO. While this step may be beneficial for the overall efficiency of the multiprocessor system it is not required since, without this step, the remote TRO entry defaults to INV.

In step 222 of FIG. 3, a line having a status of EX with its CH bit set may be changed to have a status of TEX in a requesting cache and a status of TRO in the remote cache. If allowed to age without further intervention, this would result in two copies of the line having statuses of RO and set CH bits. That is to say, two read-only lines having data different from the corresponding data in the main storage 26. To prevent this anomalous situation, the present embodiment of the invention performs a castout operation when a line having a status of TEX and a set CH bit is aged out of its TEX stack.

The inventor has determined that this method aging the temporary statuses tends to keep the lines which will be changed after a fetch request in an exclusive status for a sufficient amount of time to provide a significant improvement in performance relative to a system which does not use anticipatory exclusive statuses. However, the described method also reduces the number of unnecessary XI and invalidate events relative to a prior art systems which assign the EX status on an anticipatory basis.

While this method of aging and keeping track of the temporary statuses is preferred, it is not the only method contemplated by the inventor. For example, the existence of a temporary status may be indicated by an additional bit in the directory entry for the line. This entry may be just in the directory of the storage controller or it may be in the directories of both the storage controller and the buffer controllers. In this alternative embodiment, the statuses may be aged by periodically resetting all temporary bits in a directory, and changing the status of the corresponding entries as necessary. This operation may be performed, for example, each time that a line is fetched into the cache with a TEX status or each time that the status of a line already in the cache is changed to TRO. Another alternative method for periodic aging of temporary status (in particular TEX) from a temporary stack is to trigger it with a timer. The timer is set when there is TEX status at a buffer controller, and upon each timer pop one TEX status may be released.

It is not necessary to use both TRO and TEX states for particular applications. For example, a design may use only TEX states. In step 222 of FIG. 3, when a D-fetch request is given TEX status, the remote EX copy may be invalidated as in classical designs instead of being changed to TRO status. Unnecessary XI actions still can be reduced by releasing some TEX statuses (changed to RO) early. This avoids the need to signal the remote buffer controller to change TRO status to RO status when another buffer controller changes a TEX status to RO status. On the other hand, the benefit of avoiding unnecessary cache line invalidations is lost.

Although the system described above is in the context of a store-in (i.e., SI) cache memory system it is contemplated that the same type of system may be used advantageously in a store-through cache memory system. The only significant difference in implementation for a store-through cache system would be the elimination of castout operations, since, in a store-through cache system data is automatically stored through the cache into the main storage.

The invention claimed is:

1. In a multiprocessor computer system including a main memory and a plurality of processors, each associated with a respective cache memory, a method for controlling access by one of the plurality of processors to data not found in its associated, cache memory comprising the steps of:
   (a) transferring, in response to a memory access request of a first type from the one processor, a line of memory words, containing the data to be accessed, from the main memory or the cache memory associated with another one of the plurality of processors to the cache memory associated with the one processor;
   (b) assigning, to the line of memory words, a first status value in response to the access request of the first type, said first status value indicating that memory access requests of a second type, different from said first type, are allowed for the data contained in said line of memory words;
   (c) assigning a second status value to the line of memory words on the occurrence of a predetermined event, said second status value indicating that only memory access requests of said first type are allowed for the data contained in said line of memory words; and
   (d) assigning a third status value to the line of memory words responsive to a memory access request of said second type, for the data contained in said line of memory words, occurring before said predetermined event, said third status value indicating that memory access requests of said second type to the data in said line of memory words are allowed.

2. The method set forth in claim 1 wherein said step (b) includes the steps of:
   storing said second status value in a directory entry corresponding to said line of memory words; and
   storing a token value representing said line of memory words in an auxiliary memory coupled to said associated cache memory;
   wherein said first status value for said line of memory words is defined as a combination of said second status value and said token value.

3. The method set forth in claim 2 wherein said step (c) includes the step of deleting said token from said auxiliary memory to change the first status value assigned to said line of memory words to said second status value.

4. The method set forth in claim 2 wherein said step (d) includes the steps of:
   deleting said token value from said auxiliary memory; and
   storing said third status value in the directory entry corresponding to said line of memory words.

5. The method set forth in claim 1 wherein said predetermined event includes the storing of a further line of memory words in said associated cache memory in response to a further memory access request of said first type from said one processor.

6. In a data processing system including first and second processors coupled to respective first and second cache memories, a method of controlling access to data requested by said first processor in a memory access request of a first type from said first processor, wherein said data is absent from said first cache memory and present in said second cache memory, said method comprising the steps of:
   (a) copying said data from the second cache memory to the first cache memory;
   (b) assigning a first status value to the copied data in the first cache memory, said first status value indicating that access of a second type is permissible for said copied data;
   (c) assigning a temporary second status value to the data in the second cache memory concurrently with the assignment of said first status value to the copied data in the first cache memory, said temporary second status value indicating that access of said second type by said second processor is not permissible for the data in the second cache memory;
   (d) assigning a permanent second status value to the copies data in the first cache memory if access of said second type is not requested by the first processor before the occurrence of a predetermined event, said permanent second status value indicating that only access of said first type is permissible for the copies data in the first cache memory.

7. The method set forth in claim 5 further including the step of assigning a third status value to the copies data in the first cache memory and an invalid status value to the data in the second cache memory if access of said second type is requested by the first processor before the occurrence of said predetermined event, said third status value indicating that access of said second type is permissible and said invalid status value indicating that neither access of said first type nor access of said second type is permissible.

8. A cache memory system for use in a multiprocessor system which includes a main memory and a plurality of processors, said cache memory system comprising:
   a plurality cache memories, each connected to a respectively different one of said plurality of processors;
   storage control means, coupled to said plurality of cache memories, to said main memory and to the plurality of processors, for copying respective lines of memory words, containing data to be accessed, from said main memory or said cache memories to said cache memories in response to respective memory access requests from said plurality of processors;
   wherein each of said cache memories includes:
      buffer memory means for holding lines of memory words; and
      buffer control means, coupled to said buffer memory means, for controlling access to data stored in said buffer memory means in response to an access request of a first type, said buffer control means including:
         means for assigning a first status value, indicating that memory access requests of a second type, different from said first type, are allowed for the data contained in said line of memory words;

means for assigning a second status value to the line of memory words responsive to the occurrence of a predetermined event, said second status value indicating that only memory access requests of said first type are allowed for the data contained in said line of memory words; and means for assigning a third status value to the line of memory words responsive to a data access request of said second type, for the data contained in said line of memory words, occurring before said predetermined event, said third status value indicating that access of said second type, to the data in said line of memory words, is permissible.

* * * * *